United States Patent
Iyer et al.

(10) Patent No.: US 11,913,969 B2
(45) Date of Patent: Feb. 27, 2024

(54) METHOD FOR CALIBRATING A RADIOMETRIC DENSITY MEASURING DEVICE

(71) Applicant: Endress+Hauser SE+Co. KG, Maulburg (DE)

(72) Inventors: Arun Shankar Venkatesh Iyer, Lörrach (DE); Narcisse Michel Nzitchieu Gadeu, Maulburg (DE); Simon Weidenbruch, Lörrach (DE); Jörn Lange, Schopfheim (DE); Sebastian Eumann, Berlin (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 470 days.

(21) Appl. No.: 17/360,136

(22) Filed: Jun. 28, 2021

(65) Prior Publication Data
US 2022/0317007 A1    Oct. 6, 2022

(30) Foreign Application Priority Data
Apr. 1, 2021    (DE) .................... 10 2021 108 307.9

(51) Int. Cl.
*G01N 9/24* (2006.01)
*G01F 25/20* (2022.01)
*G01F 23/288* (2006.01)

(52) U.S. Cl.
CPC ............. *G01N 9/24* (2013.01); *G01F 23/288* (2013.01); *G01F 25/20* (2022.01)

(58) Field of Classification Search
CPC .......... G01N 9/24; G01F 23/288; G01F 25/20
See application file for complete search history.

(56) References Cited

U.S. PATENT DOCUMENTS

2020/0393391 A1* 12/2020 Iyer ..................... G01N 23/12

FOREIGN PATENT DOCUMENTS

DE      102017130534 B4    12/2020
EP          2169389 A1     3/2010

* cited by examiner

*Primary Examiner* — David P Porta
*Assistant Examiner* — Mamadou Faye
(74) *Attorney, Agent, or Firm* — Christopher R. Powers; Endress+Hauser (USA) Holding, Inc.

(57) ABSTRACT

A method for calibrating a radiometric device for determining and/or monitoring the density of a medium located in a container includes: determining the count rate of the radioactive radiation after it has passed through the empty container on the basis of the activity of the transmitting unit; determining the measured count rate of the radioactive radiation after it has passed through the container when a calibration medium of known density is located in the container; determining the mass attenuation coefficient according to the formula $\mu = -(\ln(N/N_0))/(\rho_1 D)$, where D is a beam path of the radioactive radiation or inner diameter of the container, and $\rho_1$ is density of the calibration medium; and calculating a calibration curve representing the dependence of the density of the medium on the count rate of the measured radiation intensity after the radiation has passed through the container.

8 Claims, 1 Drawing Sheet

METHOD FOR CALIBRATING A RADIOMETRIC DENSITY MEASURING DEVICE

CROSS-REFERENCE TO RELATED APPLICATION

The present application is related to and claims the priority benefit of German Patent Application No. 10 2021 108 307.9, filed on Apr. 1, 2021, the entire contents of which are incorporated herein by reference.

TECHNICAL FIELD

The present disclosure relates to a method for calibrating a radiometric device for determining and/or monitoring the density of a medium located in a container, a transmitting unit and a receiving unit being provided, the transmitting unit emitting radioactive radiation of a predefined intensity, and the receiving unit receiving the radioactive radiation emitted by the transmitting unit after said radioactive radiation has passed through the medium, and a control/evaluation unit being provided which determines the density of the medium located in the container on the basis of the measured values determined by the receiving unit.

BACKGROUND

Radiometric fill level or density measurements are used whenever other measuring methods often used fail or can no longer be used. Radiometric density measurements are used, for example, in the production process of aluminum from bauxite and in the measurement of the density of sludges, which usually contain rocks, within the context of dredging work in sea or river environments. The radiometric density measurement is often carried out in conjunction with a flow measurement.

In a radiometric density measurement, the medium located in a container (e.g., tank, silo, pipeline, etc.) may be irradiated by gamma radiation. The radiation emanates from a gamma source and is detected by a receiving unit (scintillator) which is positioned in such a way that it detects the gamma radiation emitted by the transmitting unit after said radiation has passed through the medium. Depending on the application, Cs137 or Co60 sources, for example, are used as the gamma source. The receiving unit consists either of plastic or of a crystal, a photomultiplier and receiving elements.

The gamma radiation emitted by the transmitting unit is at least weakened or attenuated when passing through the medium and/or the container. The weakening or attenuation of gamma radiation exhibits a functional dependence on the density of the medium present in the container. The weakened or attenuated gamma radiation impinges on the detector material of the detector unit and is transformed there into light pulses which are detected by a detector, for example a photodiode. To determine the density, the number of light pulses generated by the gamma radiation when impinging on the detector material is counted.

The attenuation $F_D$ of the gamma radiation when passing through the medium can be described by the Beer-Lambert law:

$$F_D = N/No = e^{-\mu i \cdot D}$$

Here, $\mu i$ is the linear attenuation coefficient, and D is the beam path. In the case of a pipeline with a radiometric density measuring device fastened thereto, the beam path corresponds, for example, to the inner diameter of the pipeline, increased by twice the value of the thickness of the wall of the container. If the inner diameter of the pipeline is much greater than the thickness of the wall of the pipeline, the weakening or attenuation of the gamma radiation by the material of the wall of the pipeline can be disregarded. Alternatively, the weakening of the gamma radiation by the wall of the container can be determined experimentally with an empty container. Due to the high radiation incident on the detector, this path is problematic in practice. It is also possible to calculate the weakening of the gamma radiation as it passes through the material of the wall of the container.

The linear attenuation coefficient is a function of the energy of the incident gamma radiation, the chemical composition of the medium being irradiated, and the density of the medium. The dependence of the attenuation of the gamma radiation on the properties of the medium can be virtually completely eliminated via the introduction of the mass attenuation constant $\mu$, which is derived from the linear attenuation coefficient $\mu i$. Under ideal conditions, the mass attenuation coefficient is independent of the density and the nature of the medium and thus only dependent on the energy of the incident gamma radiation. This fact can be explained in that the gamma radiation used in the density measurement lies in an energy range of 0.5 to 0.6 MeV. In this energy range, the Compton effect, i.e., the inelastic scattering of photons at the electrons of the scattering medium, is the dominant effect. Consequently, the mass attenuation constant $\mu$ is a constant when the energy of the photons irradiated and interacting with the medium remains constant. Thus, $\mu = \mu i/\rho$ and $N = No\ e^{-\mu \cdot \rho \cdot D}$. As a result:

$$-ln(N/No) = (\mu \cdot \rho \cdot D).$$

Since the beam path D, relative to a predefined container, is a calculable constant size, and since the mass attenuation constant is constant, $-ln(N/No)$ is proportional to $\rho$.

In order to allow a reliable radiometric determination of the density of a medium located in a container, a two-point calibration is carried out. For this purpose, in a first step, the container is filled with a first medium with a known density $\rho_1$. The medium is irradiated with gamma radiation, and the corresponding count rate N1 is determined. In a second step, the container is filled with a second medium with a known density $\rho_2$, wherein the density of the second medium differs, preferably as much as possible, from the density of the first medium. The count rate N2 is determined. The mass attenuation constant $\mu$ is calculated on the basis of the determined measured values (count rates) and the known variables ($\rho_1$, $\rho_2$). The calibration curve of the radiometric density measuring device is determined using the determined variables and stored in the density measuring device.

A radiometric density measuring device can be calibrated individually via the known method. However, this two-point calibration involves great effort. The containers, tanks, silos or pipelines often have a considerable volume, which is why the media used for the calibration must be made available in considerable quantities. While the calibration with water as a calibration medium for the upper density range is still relatively unproblematic, the filling with the second medium of lower density, for example oil, is often only possible with a lot of effort. In this connection, reference should be made to measurement sites which are, for example, located in remote, desert regions which are difficult to access. Therefore, the calibration curve is often determined on the basis of a measurement of the count rate with only one medium (one-point calibration). A standard value of 7.7 $mm^2/g$ is then assumed as the second mass attenuation coefficient which is necessary for calculating the calibration curve. This value is based on empirical values. Although this halves the calibration effort, in individual cases this is at the expense of the measuring accuracy of the radiometric density measuring device.

Even the known two-point calibration, that is to say the determination of the mass attenuation coefficient on the basis of the determination of the attenuation of gamma radiation when passing through two media having known different densities, is not very reliable, since the influence of the density of the two media on the mass attenuation coefficient is significantly lower in many applications than the influence of the geometric dimensions of the container and the geometric arrangement of the transmitting and receiving units.

SUMMARY

The object of the present disclosure is to specify a simple method for precise calibration of a radiometric density measuring device.

The object is achieved by a method for calibrating a radiometric device for determining and/or monitoring the density of a medium located in a container, a transmitting unit and a receiving unit being provided, the transmitting unit emitting radioactive radiation of a predefined intensity, and the receiving unit receiving the radioactive radiation emitted by the transmitting unit after said radioactive radiation has passed through the medium, and a control/evaluation unit being provided which determines the density of the medium located in the container on the basis of the intensity measured by the receiving unit, the method having the following method steps:

determining the count rate $N_0$ of the radioactive radiation after it has passed through the empty container (1) on the basis of the activity of the transmitting unit (3), determining the measured count rate N of the radioactive radiation after it has passed through the container (1) when a calibration medium of known density is located in the container (1), determining the mass attenuation coefficient ($\mu$) according to the formula $\mu=-(\ln(N/N_0))/(\rho_1 D)$, where D: beam path of the radioactive radiation or inner diameter of the container (1), $\rho_1$: density of the calibration medium, calculating a calibration curve representing the dependence of the density of the medium on the count rate of the measured radiation intensity after the radiation has passed through the container (1).

The method according to the present disclosure thus proposes a one-point calibration for calibrating a radiometric density measuring device, for which only one measuring point is determined experimentally. The first count rate $N_0$, which is required for determining the mass attenuation coefficient, is determined by means of the activity of the transmitting unit. When a radiometric density measuring device is designed, a dose rate of the receiving unit is typically selected first and then the required activity of the transmitting unit is calculated in order to select the transmitting unit accordingly. The calculation of the activity of the transmitting unit is known to the person skilled in the art from the corresponding relevant literature. The formula for calculating the activity of the transmitting unit can be used inversely for calculating the dose rate of the detector when the container is empty, from which the count rate $N_0$ is obtained. The count rate N of the gamma radiation of the transmission unit used is determined experimentally by means of the container filled with a medium of known density. Since the two count rates $N_0$ and N are thus present, the mass attenuation coefficient can be calculated directly, and a calibration curve can be determined on the basis of the two count rates and the mass attenuation coefficient.

An experimental determination of the intensity of the radiation is often excluded when the container is empty, since in this case massive over-radiation of the detector would occur. In comparison with experimental measured values obtained via two-point calibration, it has been found that the method according to the present disclosure provides very good results.

In a possible embodiment of the method according to the present disclosure, the count rate $N_0$ of the radioactive radiation after passing through the empty container is determined according to the formula $N_0=(P \cdot K \cdot B)/(F_a \cdot F_s)$, where $F_a$: square distance factor between the transmitting unit and the receiving unit, $F_s$: attenuation factor, which depends at least on the isotope of the transmitting unit and the wall of the container, P: activity of the transmitting unit, K: isotope-dependent correction factor, B: correction factor for the conversion of the dose rate to the count rate $N_0$. The distance factor $F_a$ between the transmitting unit and the receiving unit may optionally be a mean (square) distance if the transmitting unit is arranged at an angle to the receiving unit. The geometric arrangement of the radiometric density measuring device must fundamentally be taken into account. The activity P of the transmitting unit is isotope-dependent and requires correction by the isotope-dependent correction factor K. The attenuation factor $F_s$ takes into account the attenuation of the radioactive radiation when passing through the wall of the container and further layers attached to the wall of the container. The attenuation of the radioactive radiation by the air within the empty container is negligible. The correction factor B depends on the type of receiving unit and is required for converting the dose rate $F_i$ to $N_0$. The dose rate $F_i$ results from $F_i=(P \cdot K)/(F_a \cdot F_s)$.

In an embodiment, water is preferably used as the calibration medium.

In a further embodiment, the transmitting unit and the receiving unit are positioned relative to one another such that the container is irradiated perpendicular to the longitudinal axis of the container, obliquely to the longitudinal axis of the container or parallel to the longitudinal axis of the container. The container is usually a pipeline or a tank. Since gamma radiation is also transmitted through solids, the transmitting unit and the receiving unit are buckled onto the outer wall of the container. The actual arrangement is selected depending on the application in question.

In a further possible embodiment, a pipeline is used as the container, the transmitting unit and the receiving unit being fastened to opposite surface regions of the pipeline.

The receiving unit is advantageously designed and positioned in such a way that the sensitive components of the receiving unit are struck by the radiation. In order to obtain optimal measurement results, the receiving unit is designed and positioned with respect to the transmitting unit(s) such that the sensitive components of the receiving unit are struck by the radiation passing through the container.

In a further embodiment, the attenuation factor $F_s$ is calculated according to the formula $F_s=e^{aq}$ where a: isotope-dependent attenuation coefficient, q: thickness of the wall of the container measured in steel equivalents, a steel equivalent being defined as a density of the wall of the container relative to a density of steel. In the case of the empty container, the intensity of the emitted radioactive radiation is mainly weakened by the wall of the container. Any insulation layers for blocking the gamma radiation or further layers which are applied to the container between the transmitting unit and the receiving unit, may also have to be taken into account, since these likewise reduce the intensity of the emitted radioactive radiation.

The intensity of the gamma radiation decreases exponentially with the penetration depth into the irradiated medium. The half-value thickness indicates the distance covered by the gamma radiation in the material/medium at which the intensity of the gamma radiation has halved as a result of the interaction (essentially the Compton scattering) with the material/medium. The half-value thickness depends on the wavelength of the gamma radiation and on the atomic number of the material/medium being irradiated. For steel, for example, the half-value thickness is known and is approximately 14 mm thickness of steel. Consequently, the corresponding attenuation of the radioactive radiation can be calculated from the actual thickness of a steel wall of the container. If the wall of the container has a different density ($\rho_{wall}$) than steel ($\rho_{steel}$), it must be correspondingly converted. For the calculation of q, the following formula can be used: $q=(2 \cdot L \cdot \rho_{wall})/\rho_{steel}$, where L is the thickness of the wall of the container. Further layers which also attenuate the radioactive radiation may be applied to the wall of the container. In general, layers i can be introduced as additional summands into the counter of the formula, so that $q=(\Sigma_i 2 \cdot L \cdot \rho_i)/\rho_{steel}$. The factor 2 takes into account the fact that the radioactive radiation passes through the wall of the container twice and can optionally be omitted. The attenuation coefficient a is adapted to the attenuation by steel and the gamma source in question.

BRIEF DESCRIPTION OF THE DRAWINGS

The present disclosure is explained in greater detail with reference to the following drawings, FIGS. 1 and 2. In the figures.

DETAILED DESCRIPTION

Figure 1:
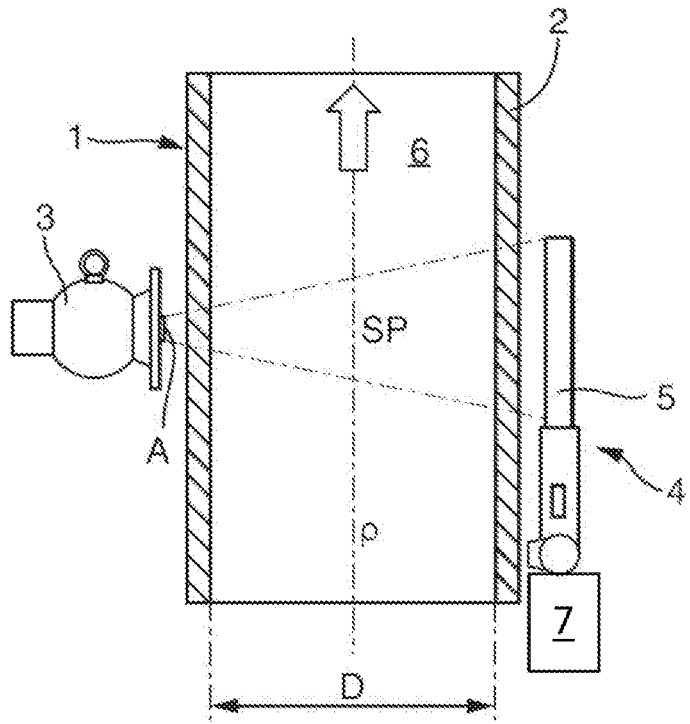
FIG. 1 shows a schematic diagram of an arrangement for radiometrically determining the density of a medium.

FIG. 1 shows a schematic diagram of an arrangement for radiometrically determining the density of a medium 6 located in a container 1, here a pipeline with a wall 2. The transmitting unit 3, with the gamma source, and the receiving unit 4 are arranged on opposite surface regions of the pipeline 1. Both components 3, 4 are fastened to the outside of the pipeline 1 via a clamping mechanism, which is not shown separately in FIG. 1.

The encapsulation of the gamma source by the surrounding housing is designed such that the gamma radiation exits from the transmitting unit 3 only in the region of the exit face A. The gamma radiation irradiates the container 1 with the medium 6 therein, the density p of which is to be determined, on the indicated beam path SP. The gamma radiation weakened by interaction with the container wall and/or the medium 6 is received by the receiving unit 4. The evaluation unit 7 determines the density of the medium 6 located in the container 1 on the basis of the intensity or the count rate of the receiving unit 4. Corresponding radiometric density measuring arrangements are offered and sold by the applicant. As already mentioned above, the arrangement of the transmitting unit 3 and the receiving unit 4 relative to the container 1 can be configured differently.

Figure 2:
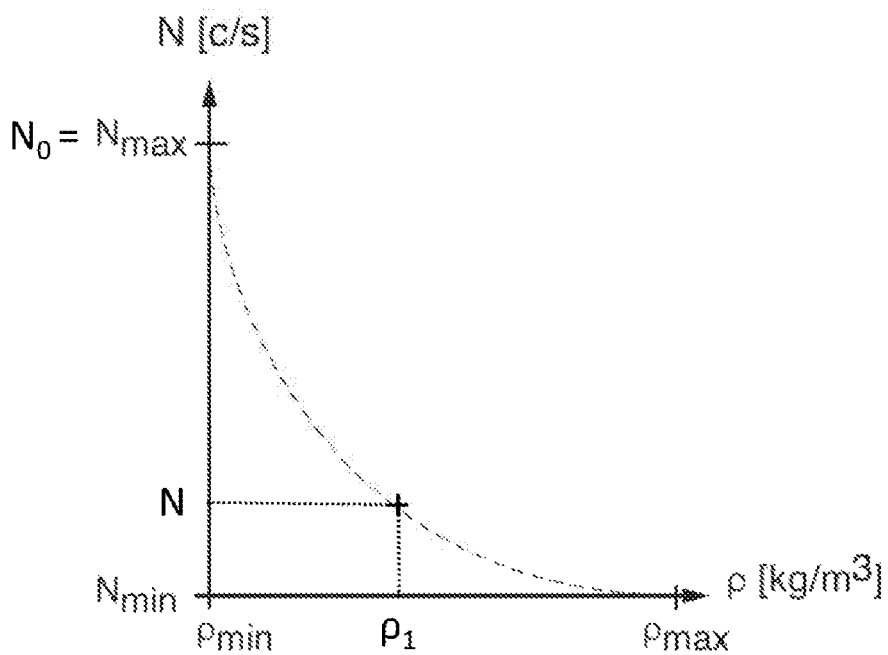
FIG. 2 shows a schematic diagram of a graph which visualizes the dependence of the count rate on the density.

FIG. 2 shows a schematic diagram of a graph which visualizes the dependence of the count rate N as a function of the density p of the medium 6. The attenuation of gamma radiation on the beam path SP by a medium 6 can be described by the Beer-Lambert law, and thus follows an e function. The attenuation F corresponds to the ratio of the count rate of the gamma radiation after passing through the medium 6 to the count rate $N_0$ of the gamma radiation emitted by the gamma source through the exit opening A. The count rate N is indicated in counts (number of events) per second (c/sec).

In FIG. 2, the count rate is plotted against the density. At maximum density $\rho_{max}$ the medium 6, the count rate $N_{min}$ approximately zero; at minimum density $\rho_{min}$ he count rate $N_{max}$ substantially equal to the count rate $N_0$ of the gamma radiation emitted by the gamma source. The following mathematical relationship applies:

$$\frac{N_{min}}{N_{max}} = e^{-\mu \cdot D \cdot (\rho_{max}+\rho_{min})}$$

The count rate $N_0$ is determined according to the present disclosure on the basis of the activity of the transmitting unit 3, only a further count rate N of a medium 6 with a defined density $\rho_1$ has to be determined. Then the mass attenuation coefficient µ can be determined, and the exemplary calibration curve shown in FIG. 2 can be calculated.

In order to illustrate the calculation of the count rate $N_0$, an example of a calculation will be shown below. By way of example, a transmission unit 3 with a Cs137 gamma source is used which has a correction factor K of 95.95 µSv·m2/(h·GBq), an activity P of 0.13 GBq and an isotope-dependent attenuation coefficient a of 0.048. The receiving unit 4 has a correction factor B of 1350 h/(s·µSv).

For a wall 2 of the steel container 1 having a thickness of 9.3 mm and a density of steel of 7890 kg/m3, an attenuation factor of $F_s=e^{aq}=2.4$ results. The distance between the transmitting unit 3 and the receiving unit 4 is 0.45 m, resulting in a distance factor of $F_a=(0.45 \text{ m})^2=0.2 \text{ m}^2$. This results in a dose rate $F_i$ of 25.5 µSv/h and thus a count rate $N_0$ of 34479 l/s.

We claim:

1. A method for calibrating a radiometric device for determining and/or monitoring the density of a medium within a container, the method comprising:

providing:
a transmitting unit configured to emit radioactive radiation of a predefined intensity;
a receiving unit configured to receive the radiation emitted by the transmitting unit after the radiation has passed through the medium; and
a control/evaluation unit configured to determine a density of the medium within the container based on a radiation intensity measured by the receiving unit;

determining a count rate of the radiation after passing through the container when empty based on an activity of the transmitting unit;

determining a count rate of the radiation after passing through the container when a calibration medium of known density is within the container;

determining a mass attenuation coefficient defined as:

$$\mu=-(ln(N/N_0))/(\rho_1 D),$$

wherein D is a beam path of the radiation or an inner dimension of the container, $\rho_1$ is the density of the calibration medium, $N_0$ is the count rate of the measured radiation after passing through the empty container, and N is the count rate of the measured radiation after passing through the calibration medium; and calculating a calibration curve representing a dependence of the density of the medium on the count rate of the measured radiation intensity after the radiation has passed through the container.

2. The method of claim 1, wherein the count rate of the radiation after passing through the empty container is determined according to the formula:

$$N_0 = (P \cdot K \cdot B)/(F_a \cdot F_s),$$

where $F_a$ is a square distance factor between the transmitting unit and the receiving unit, $F_s$ is an attenuation factor that depends at least on a wall of the container and an isotope of the transmitting unit, P is the activity of the transmitting unit, K is an isotope-dependent correction factor, and B is a correction factor for a conversion of a pulse rate to the count rate of the measured radiation after passing through the empty container.

3. The method of claim 2, wherein the attenuation factor $F_s$ is calculated according to the formula:

$$F_s = e^{a \cdot q},$$

wherein a is an isotope-dependent attenuation coefficient, q is a thickness of the wall of the container measured in steel equivalents, wherein a steel equivalent is defined as a density of the wall of the container relative to a density of steel.

4. The method of claim 1, wherein water is the calibration medium.

5. The method of claim 1, wherein the transmitting unit and the receiving unit are positioned relative to one another such that the container is irradiated perpendicular to a longitudinal axis of the container, obliquely to the longitudinal axis of the container, or parallel to the longitudinal axis of the container.

6. The method of claim 5, wherein the receiving unit is configured and positioned such that sensitive components of the receiving unit are irradiated by the radiation.

7. The method of claim 1, wherein the container a pipeline, and wherein the transmitting unit and the receiving unit are fastened to the pipeline on opposing surface regions of the pipeline.

8. The method of claim 7, wherein the receiving unit is configured and positioned such that sensitive components of the receiving unit are irradiated by the radiation.

* * * * *